US009483167B2

(12) United States Patent
Tijssen

(10) Patent No.: US 9,483,167 B2
(45) Date of Patent: Nov. 1, 2016

(54) USER INTERFACE FOR A TOUCH ENABLED DEVICE

(75) Inventor: Remon Tijssen, Mill Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1128 days.

(21) Appl. No.: 12/893,669

(22) Filed: Sep. 29, 2010

(65) Prior Publication Data
US 2013/0132888 A1   May 23, 2013

(51) Int. Cl.
*G06F 3/048*    (2013.01)
*G06F 3/0485*   (2013.01)
G06F 3/0483    (2013.01)
G06F 17/21     (2006.01)

(52) U.S. Cl.
CPC .......... *G06F 3/0485* (2013.01); *G06F 3/0483* (2013.01); *G06F 17/217* (2013.01)

(58) Field of Classification Search
CPC ..................................................... G06F 17/217
USPC ................................ 715/784–787, 863, 251
See application file for complete search history.

(56) References Cited

U.S. PATENT DOCUMENTS

| 5,124,693 | A | 6/1992 | Himelstein et al. |
|---|---|---|---|
| 5,132,671 | A | 7/1992 | Louis et al. |
| 5,301,267 | A | 4/1994 | Hassett et al. |
| 5,499,366 | A | 3/1996 | Rosenberg et al. |
| 5,572,639 | A | 11/1996 | Gantt |
| 5,577,170 | A | 11/1996 | Karow |
| 5,684,510 | A | 11/1997 | Brassell et al. |
| 5,715,473 | A | 2/1998 | Reed |
| 5,771,042 | A | 6/1998 | Santos-Gomez |
| 5,872,566 | A | 2/1999 | Bates et al. |
| 5,930,408 | A | 7/1999 | Seto |
| 5,943,050 | A | 8/1999 | Bullock et al. |
| 5,956,736 | A | 9/1999 | Hanson et al. |
| 6,005,967 | A | 12/1999 | Nakagawa et al. |
| RE36,704 | E | 5/2000 | Parker et al. |
| 6,377,240 | B1 | 4/2002 | Baudel et al. |
| 6,469,709 | B1 | 10/2002 | Sakai |
| 6,480,813 | B1 | 11/2002 | Bloomquist et al. |
| 6,678,410 | B1 | 1/2004 | Phinney et al. |
| 6,828,971 | B2 | 12/2004 | Uesaki et al. |

(Continued)

OTHER PUBLICATIONS

"Non-Final Office Action", U.S. Appl. No. 13/309,924, (Mar. 1, 2013), 19 pages.

(Continued)

*Primary Examiner* — Ajay Bhatia
*Assistant Examiner* — Phuong Nguyen
(74) *Attorney, Agent, or Firm* — Wolfe-SBMC

(57) ABSTRACT

A graphical user interface displays a first portion of a data file. Further, a switch indicator is displayed. In addition, a first input that has a first proximity within a range of predetermined first proximities with respect to the switch indicator is received at a processor operably connected to the graphical user interface. In addition, a second portion of the data file based on the first input is displayed at the graphical user interface. Further, a second input that has a second proximity within a range of predetermined second proximities with respect to the switch indicator is received at the processor. The range of predetermined second proximities is distinct from the range of first predetermined proximities. In addition, the graphical user interface displays a subset of the second portion of the data file based on the second input.

20 Claims, 14 Drawing Sheets

(56) References Cited

U.S. PATENT DOCUMENTS

| | | |
|---|---|---|
| 6,959,112 B1 | 10/2005 | Wagman |
| 7,034,845 B2 | 4/2006 | Perry et al. |
| 7,058,903 B1 | 6/2006 | Jonach et al. |
| 7,136,067 B2 | 11/2006 | Stamm et al. |
| 7,222,306 B2 | 5/2007 | Kaasila et al. |
| 7,236,174 B2 | 6/2007 | Stamm et al. |
| 7,292,249 B2 | 11/2007 | Stamm et al. |
| 7,437,683 B1* | 10/2008 | Beezer et al. ............... 715/851 |
| 7,545,392 B2 | 6/2009 | Sprang et al. |
| 7,583,267 B2 | 9/2009 | Stamm et al. |
| 7,594,174 B2 | 9/2009 | Truelove et al. |
| 7,684,619 B2 | 3/2010 | Sprang et al. |
| 7,769,819 B2 | 8/2010 | Lerman et al. |
| 8,223,165 B1 | 7/2012 | Jitkoff et al. |
| 8,269,736 B2 | 9/2012 | Wilairat |
| 8,315,473 B1 | 11/2012 | Tao et al. |
| 8,386,956 B2 | 2/2013 | Ording et al. |
| 8,416,243 B2 | 4/2013 | Plummer |
| 8,471,856 B2 | 6/2013 | Stamm et al. |
| 8,842,120 B2 | 9/2014 | Tijssen |
| 8,896,621 B1 | 11/2014 | Sipher et al. |
| 9,229,636 B2 | 1/2016 | Tijssen et al. |
| 2001/0024212 A1 | 9/2001 | Ohnishi |
| 2002/0051007 A1 | 5/2002 | Kitagawa et al. |
| 2002/0085018 A1 | 7/2002 | Chien |
| 2003/0038797 A1 | 2/2003 | Vazzana |
| 2004/0066393 A1 | 4/2004 | Cragun |
| 2004/0177323 A1 | 9/2004 | Kaasila et al. |
| 2004/0183817 A1 | 9/2004 | Kaasila |
| 2004/0268223 A1* | 12/2004 | Tojo ............... 715/500.1 |
| 2005/0012755 A1 | 1/2005 | Dresevic et al. |
| 2005/0062758 A1 | 3/2005 | Kaasila et al. |
| 2005/0162430 A1 | 7/2005 | Stamm et al. |
| 2005/0168476 A1 | 8/2005 | Levene et al. |
| 2005/0188309 A1 | 8/2005 | Tasker et al. |
| 2005/0190187 A1 | 9/2005 | Salesin et al. |
| 2005/0195221 A1 | 9/2005 | Berger et al. |
| 2005/0237342 A1 | 10/2005 | Stamm et al. |
| 2006/0017733 A1 | 1/2006 | Matskewich et al. |
| 2006/0022956 A1 | 2/2006 | Lengeling |
| 2006/0048069 A1 | 3/2006 | Igeta |
| 2006/0114258 A1 | 6/2006 | Stamm et al. |
| 2006/0149516 A1 | 7/2006 | Bond et al. |
| 2007/0070071 A1 | 3/2007 | Terazono et al. |
| 2007/0097128 A1 | 5/2007 | Lim |
| 2007/0106929 A1 | 5/2007 | Foster et al. |
| 2007/0139413 A1 | 6/2007 | Stamm et al. |
| 2007/0139415 A1 | 6/2007 | Stamm et al. |
| 2007/0150834 A1 | 6/2007 | Muller et al. |
| 2007/0157097 A1 | 7/2007 | Peters |
| 2007/0188497 A1 | 8/2007 | Dowling et al. |
| 2007/0189708 A1 | 8/2007 | Lerman et al. |
| 2007/0216689 A1 | 9/2007 | Stamm et al. |
| 2007/0240057 A1 | 10/2007 | Satterfield et al. |
| 2007/0266319 A1 | 11/2007 | Matsuo |
| 2007/0266335 A1 | 11/2007 | Zielinski et al. |
| 2007/0268273 A1 | 11/2007 | Westerman et al. |
| 2007/0273668 A1 | 11/2007 | Park et al. |
| 2008/0012862 A1 | 1/2008 | Duggan et al. |
| 2008/0024500 A1 | 1/2008 | Bae |
| 2008/0034317 A1 | 2/2008 | Fard et al. |
| 2008/0097621 A1 | 4/2008 | Tasker et al. |
| 2008/0165193 A1 | 7/2008 | Stamm et al. |
| 2008/0229238 A1 | 9/2008 | Young |
| 2008/0238916 A1 | 10/2008 | Ghosh et al. |
| 2008/0238922 A1 | 10/2008 | Rhodes et al. |
| 2008/0244410 A1 | 10/2008 | Schormann |
| 2008/0294974 A1 | 11/2008 | Nurmi et al. |
| 2008/0301547 A1 | 12/2008 | Karunakaran et al. |
| 2009/0184980 A1 | 7/2009 | Mansfield |
| 2009/0288043 A1 | 11/2009 | Willis |
| 2009/0295826 A1 | 12/2009 | Good et al. |
| 2009/0303178 A1* | 12/2009 | Koda et al. ............... 345/156 |
| 2010/0013862 A1 | 1/2010 | Gershfeld |
| 2010/0056221 A1* | 3/2010 | Park ............... 455/566 |
| 2010/0058226 A1* | 3/2010 | Flake et al. ............... 715/786 |
| 2010/0058228 A1* | 3/2010 | Park ............... 715/786 |
| 2010/0088632 A1 | 4/2010 | Knowles et al. |
| 2010/0162151 A1 | 6/2010 | Class et al. |
| 2010/0214257 A1 | 8/2010 | Wussler et al. |
| 2010/0271404 A1 | 10/2010 | Marr |
| 2010/0278504 A1 | 11/2010 | Lyons et al. |
| 2010/0313154 A1 | 12/2010 | Choi et al. |
| 2010/0318908 A1 | 12/2010 | Neuman et al. |
| 2011/0025719 A1 | 2/2011 | Yanase |
| 2011/0069085 A1 | 3/2011 | Weber et al. |
| 2011/0072344 A1 | 3/2011 | Harris et al. |
| 2011/0116769 A1 | 5/2011 | Suglyama et al. |
| 2011/0122159 A1* | 5/2011 | Bergsten et al. ............... 345/684 |
| 2011/0138313 A1 | 6/2011 | Decker et al. |
| 2011/0157029 A1* | 6/2011 | Tseng ............... 345/173 |
| 2011/0167349 A1 | 7/2011 | Samra et al. |
| 2011/0175821 A1 | 7/2011 | King |
| 2011/0181521 A1 | 7/2011 | Reid et al. |
| 2011/0181617 A1 | 7/2011 | Tsuda et al. |
| 2011/0197124 A1 | 8/2011 | Garaventa |
| 2011/0197153 A1 | 8/2011 | King et al. |
| 2011/0246916 A1 | 10/2011 | Leskelä et al. |
| 2011/0302532 A1 | 12/2011 | Missig |
| 2011/0314424 A1 | 12/2011 | Gusmorino et al. |
| 2012/0017153 A1 | 1/2012 | Matsuda et al. |
| 2012/0017163 A1 | 1/2012 | Ragan |
| 2012/0042272 A1 | 2/2012 | Hong et al. |
| 2012/0092340 A1 | 4/2012 | Sarnoff et al. |
| 2012/0110438 A1 | 5/2012 | Peraza et al. |
| 2012/0198330 A1* | 8/2012 | Koppel et al. ............... 715/251 |
| 2012/0210222 A1 | 8/2012 | Matsuda et al. |
| 2012/0313865 A1 | 12/2012 | Pearce |
| 2013/0097502 A1 | 4/2013 | Langmacher et al. |
| 2013/0127867 A1 | 5/2013 | Tijssen et al. |
| 2013/0127878 A1 | 5/2013 | Tijssen |
| 2013/0127910 A1 | 5/2013 | Tijssen et al. |
| 2013/0132878 A1 | 5/2013 | Tijssen |
| 2013/0132907 A1 | 5/2013 | Kukulski et al. |
| 2013/0145268 A1 | 6/2013 | Kukulski |
| 2013/0145270 A1 | 6/2013 | Piran et al. |
| 2014/0088926 A1 | 3/2014 | Rhoades et al. |
| 2015/0199073 A1 | 7/2015 | Kukulski et al. |
| 2016/0110053 A1 | 4/2016 | Tijssen et al. |

OTHER PUBLICATIONS

"Non-Final Office Action", U.S. Appl. No. 13/225,203, (Apr. 12, 2013), 12 pages.

"Non-Final Office Action", U.S. Appl. No. 13/039,023, (Jul. 9, 2013),19 pages.

"Canvas Tips and Techniques: Creating a Presentation in Canvas", available at <http://www.adeptscience.co.uk/products/dataanal/canvas/tutorials/presentation.pdf>, (2002), 9 pages.

"Surface by Microsoft, Pre-Order the New Windows Tablet", retrieved from <http://www.microsoft.com/surface/en-US> on Oct. 17, 2012, 5 pages.

"The Photo Finishes Corel Draw X4 Suite", retrieved from <http://thephotofinishes.com/coreldx4.htm> on Oct. 11, 2010, 8 pages.

Bain, Steve "Cool Tricks with Paragraph Text in CorelDRAW", retrieved from <http://mc.corel.com/servlet/Satellite?c=Content_C1&cid=1158342655543&lc=en&pagename=CorelCom%2FLayout> on Jun. 18, 2010, (2010), 8 pages.

"Final Office Action", U.S. Appl. No. 13/039,023, (Oct. 11, 2013), 22 pages.

"Final Office Action", U.S. Appl. No. 13/225,203, (Aug. 29, 2013),10 pages.

"Final Office Action", U.S. Appl. No. 13/309,924, (Sep. 25, 2013),17 pages.

"Fontlab Fontographer 5", Fontlab, Ltd., (Jun. 2010), 525 pages.

"Non-Final Office Action", U.S. Appl. No. 12/901,799, (Sep. 16, 2013), 22 pages.

"Non-Final Office Action", U.S. Appl. No. 13/039,081, (Oct. 11, 2013),14 pages.

(56) References Cited

OTHER PUBLICATIONS

"Adobe PostScript", Available at <http://www.signwarehouse.com/tech-support/manuals/Laser%20Master.pdf>, 2006, 181 pages.

"Final Office Action", U.S. Appl. No. 12/901,799, Feb. 7, 2014, 23 pages.

"Final Office Action", U.S. Appl. No. 13/039,081, Feb. 24, 2014, 16 pages.

"Non-Final Office Action", U.S. Appl. No. 13/038,871, Mar. 18, 2014, 14 pages.

"Non-Final Office Action", U.S. Appl. No. 13/039,023, Jan. 31, 2014, 33 pages.

"Non-Final Office Action", U.S. Appl. No. 13/339,367, Dec. 26, 2013, 21 pages.

"TrueType 1.0 Font Files", Technical Specification, Revision 1.66, Aug. 1995, 408 pages.

"Non-Final Office Action", U.S. Appl. No. 13/225,203, Mar. 20, 2014, 12 pages.

"Non-Final Office Action", U.S. Appl. No. 13/309,924, Jul. 3, 2014, 14 pages.

"Final Office Action", U.S. Appl. No. 13/339,367, Jul. 3, 2014, 19 pages.

"Notice of Allowance", U.S. Appl. No. 13/039,081, May 15, 2014, 4 pages.

"Final Office Action", U.S. Appl. No. 13/039,023, Jul. 3, 2014, 43 pages.

"Final Office Action", U.S. Appl. No. 13/038,871, Aug. 6, 2014, 14 pages.

"Final Office Action", U.S. Appl. No. 13/225,203, Aug. 28, 2014, 16 pages.

"Non-Final Office Action", U.S. Appl. No. 12/901,799, Sep. 16, 2014, 16 pages.

"SolidWorks Help—Highlighting", Retrieved from <http://help.solidworks.com/2012/English/SolidWorks/sIdworks/c_Highlighting.htm> in Sep. 16, 2014, 2012, 2 pages.

"Better editing with custom screen layouts", Retrieved from <https://digitalfilms.wordpress.com/2010/06/18/> on Jan. 30, 2015, Jun. 18, 2010, 7 pages.

"Final Office Action", U.S. Appl. No. 13/309,924, Jan. 29, 2015, 16 pages.

"Non-Final Office Action", U.S. Appl. No. 13/339,367, Dec. 16, 2014, 21 pages.

Hauptmann, et al., "Artificial Intelligence Techniques in the Interface to a Digital Video Library", CHI '97 Extended Abstracts on Human Factors in Computing Systems, Mar. 1997, 6 pages.

"Final Office Action", U.S. Appl. No. 12/901,799, Mar. 25, 2015, 18 pages.

"Final Office Action", U.S. Appl. No. 13/339,367, Apr. 23, 2015, 22 pages.

"Non-Final Office Action", U.S. Appl. No. 13/038,871, Mar. 17, 2015, 11 pages.

St."Characterizing Tool Use in an Interactive Drawing Environment", SmartGraphics, Proceedings of the 2nd International Symposium on Smart Graphics, 2002, 8 pages.

"Final Office Action", U.S. Appl. No. 13/339,367, Jun. 15, 2016, 28 pages.

"Notice of Allowance", U.S. Appl. No. 13/038,871, Aug. 24, 2015, 15 pages.

"Non-Final Office Action", U.S. Appl. No. 13/339,367, Jan. 15, 2016, 21 pages.

"Advisory Action", U.S. Appl. No. 13/339,367, Oct. 21, 2015, 3 pages.

* cited by examiner

Docket No. B1242

USER INTERFACE FOR A TOUCH ENABLED DEVICE

BACKGROUND

1. Field

This disclosure generally relates to user interfaces. More particularly, the disclosure relates to user interfaces for touch enabled devices.

2. General Background

User interfaces typically allow a user to interact with a computing device. A variety of approaches involve a user inputting data through the user interface via a user input device such as a keyboard, mouse, microphone, etc. Recent developments currently allow a user to optionally input data through a touch enabled device. The touch enabled device allows a user to touch the objects with one or more fingers or a mouse pointer to perform actions on the objects.

Current approaches do not allow a user to easily navigate through large quantities of data. As a result, users may have degradation in performance by switching from a standard device to a touch enabled device.

SUMMARY

In one aspect of the disclosure, a computer program product is provided. The computer program product includes a computer useable medium having a computer readable program. The computer readable program when executed on a computer causes the computer to display, at a graphical user interface, a first portion of a data file. Further, the computer readable program when executed the computer causes the computer to display, at the graphical user interface, a switch indicator. In addition, the computer readable program when executed the computer causes the computer to receive, at a processor operably connected to the graphical user interface, a first input that has a first proximity within a range of predetermined first proximities with respect to the switch indicator. The computer readable program when executed the computer also causes the computer to display, at the graphical user interface, a second portion of the data file based on the first input. Further, the computer readable program when executed the computer causes the computer to receive, at the processor, a second input that has a second proximity within a range of predetermined second proximities with respect to the switch indicator. The range of predetermined second proximities is distinct from the range of first predetermined proximities. In addition, the computer readable program when executed the computer causes the computer to display, at the graphical user interface, a subset of the second portion of the data file based on the second input.

In another aspect, a computer program product is provided. The computer program product includes a computer useable medium having a computer readable program. The computer readable program when executed on a computer causes the computer to display, at a graphical user interface, an enlarged view of a page from a plurality of pages in a data file without remaining pages from the plurality of pages. Further, the computer readable program when executed the computer causes the computer to receive a first input on the page. In addition, the computer readable program when executed the computer causes the computer to display, at the graphical user interface, a grid view of at least a subset of the plurality of pages in the data file that includes the page and one or more additional pages based on the first input. The computer readable program when executed the computer causes the computer to receive, at a processor operably connected to the graphical user interface, a second input that indicates a selected page of the one or more additional pages. Further, the computer readable program when executed the computer causes the computer to display, at the graphical user interface, an enlarged view of the selected page without remaining pages from the subset.

In yet another aspect, a computer program product is provided. The computer program product includes a computer useable medium having a computer readable program. The computer readable program when executed on a computer causes the computer to display, at a graphical user interface, a first grid view of a first plurality of pages of a data file. Further, the computer readable program when executed the computer causes the computer to display, at the graphical user interface, a switch indicator. In addition, the computer causes the computer to receive, at a processor operably connected to the graphical user interface, a first input that has a first proximity within a range of predetermined first proximities with respect to the switch indicator. The computer readable program when executed the computer causes the computer to display, at the graphical user interface, a second grid view of a second plurality of pages based on the first input. Further, the computer readable program when executed the computer causes the computer to receive, at the processor, a second input that has a second proximity within a range of predetermined second proximities with respect to the switch indicator. The range of predetermined second proximities is distinct from the range of first predetermined proximities. In addition, the computer readable program when executed the computer causes the computer to display, at the graphical user interface, a selected page from the second plurality of pages based on the second input.

DRAWINGS

The above-mentioned features of the present disclosure will become more apparent with reference to the following description taken in conjunction with the accompanying drawings wherein like reference numerals denote like elements and in which.

DETAILED DESCRIPTION

A user interface method, system, and computer program product are provided to expand the abilities of navigation of a touch enabled device for a user. A user is provided with a tool to navigate, browse, etc. through a data file quickly and efficiently. In one embodiment, the touch enabled device has a touch screen that allows a user to interact with the touch screen by touching the screen with his or her hands, a pen, or any other input device that is operably configured to provide input by touching and/or not touching the screen. In another embodiment, the touch enabled device has the ability to receive input from an input device such as a keyboard, mouse, or the like in addition to providing the ability to receive input through a touch screen. In yet another embodiment, a device that is not touch enabled may be utilized with the configurations provided herein.

Figure 1:
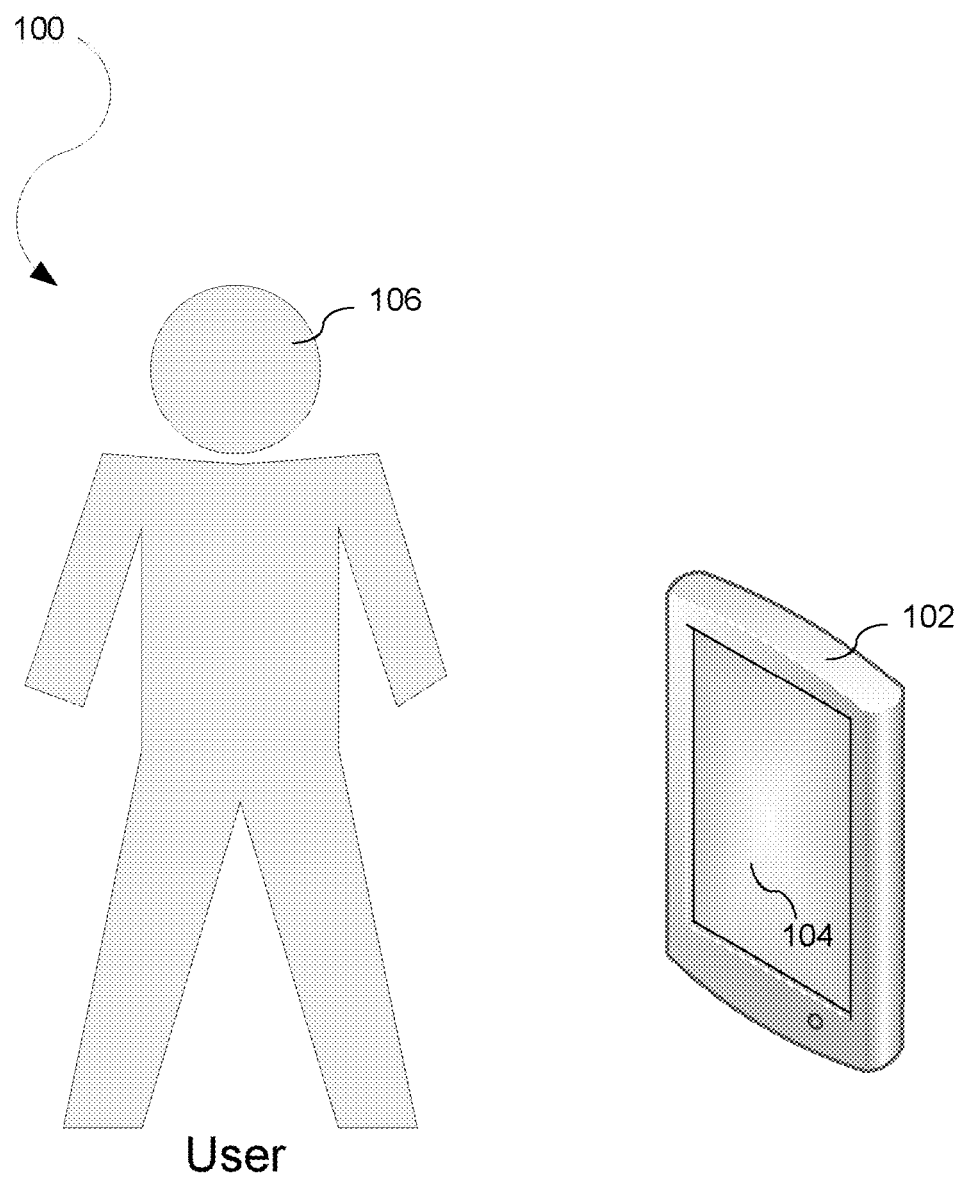
FIG. 1 illustrates a computing environment that may be utilized for navigation of a graphical user interface ("GUI").

FIG. 1 illustrates a computing environment 100 that may be utilized for navigation of a GUI 104. The computing device 102 may be any device with a processor such as a computer tablet, personal computer, laptop, notebook, cell phone, smart phone, personal digital assistant, personal medial player, set top box, etc. The computing device 102 is illustrated as a tablet only for illustrative purposes.

Figure 2A:
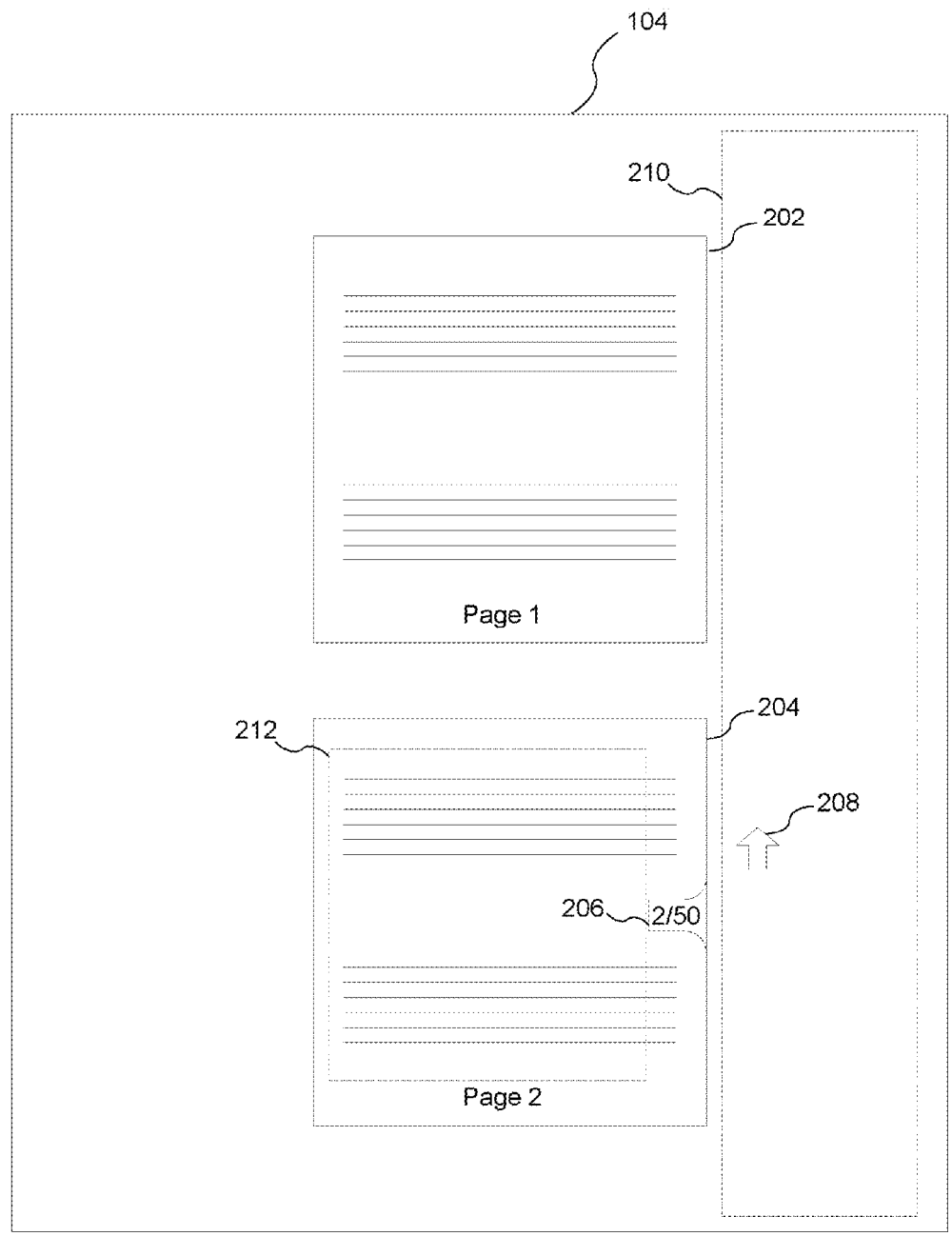
FIG. 2A illustrates an example of a plurality of pages from a data file displayed on the GUI.
Figure 2B:
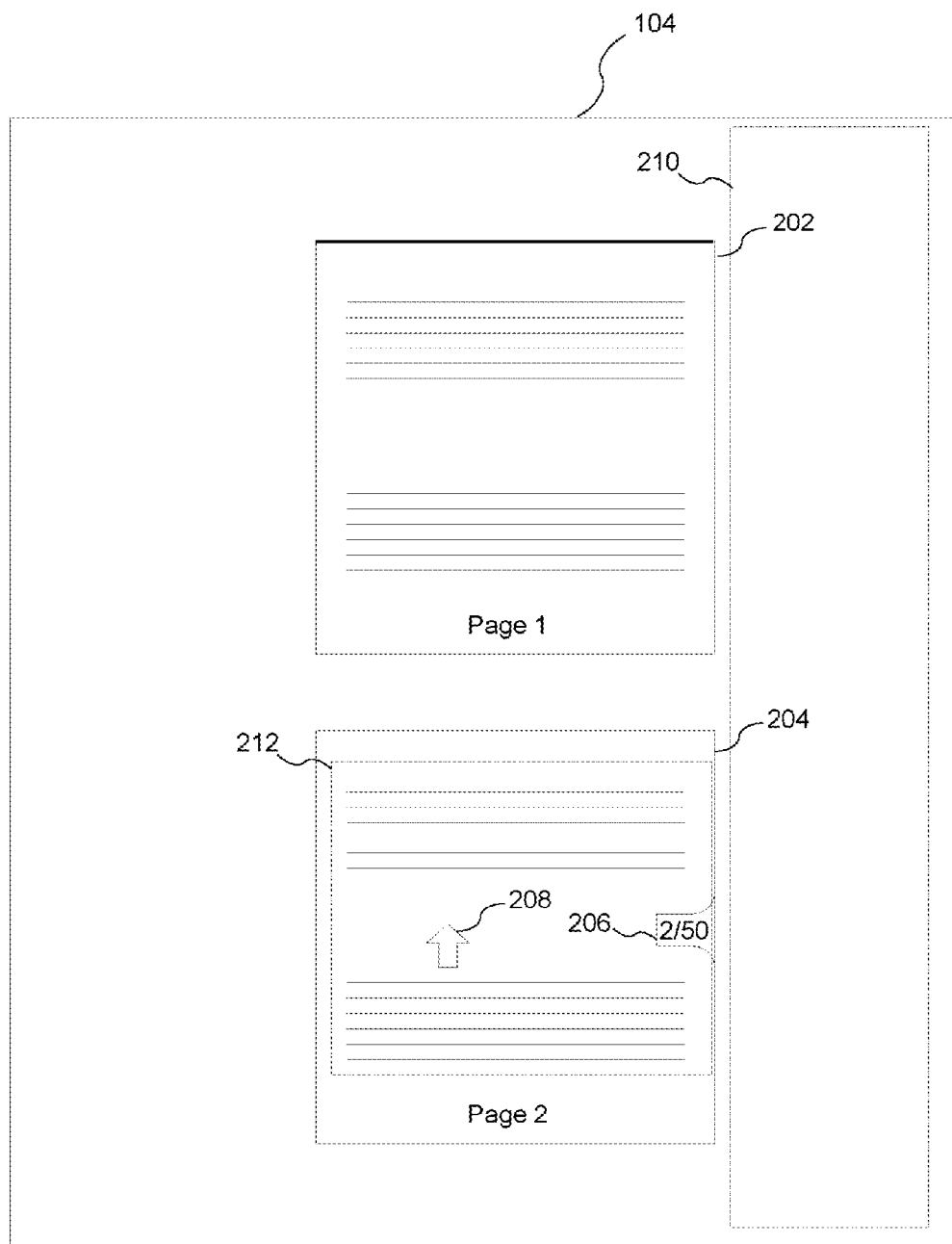
FIG. 2B illustrates the example from FIG. 2A with a fine level of navigation granularity.

FIG. 2A illustrates an example of a plurality of pages from a data file displayed on the GUI 104. The user may navigate through the different pages to find a page of interest. As an example, the user may be viewing a second page 204 and may wish to quickly browse through the other pages in the data file. In one embodiment, a switch indicator 206 is illustrated on the second page 204. The user may position a pointer, finger, or any other position indicia 208 within a first range of proximities 210 to indicate that the user would like to quickly navigate through the plurality of pages. For example, the user may touch the GUI 104 with his or her finger to the right of the switch indicator 206. The user will then be able to quickly navigate through other pages. For example, the user will be able to quickly scroll to a first page 202. For illustrative purposes, the position indicia 208 is indicated as a pointer. However, other types of symbols or no symbol at all may be utilized for any of the configurations provided herein. For example, the user may simply utilize his or her finger to touch the screen of the GUI 104 without any type of symbol indicating position. In addition, the pages may fill the full screen. Further, for illustrative purposes, the first range of proximities is indicated as a rectangular region, but the first range of proximities may include various positions, shapes, dimensions, etc. Alternatively, the user may position the position indicia 208 in a second range of proximities 212 as illustrated in FIG. 2B.

In one embodiment, the scrolling motion may be a finger swipe. In another embodiment, the scrolling motion is based on a scroll wheel.

For illustrative purposes, lines are illustrated in FIG. 2A and other figures to represent text, shapes, symbols, etc. The configurations provided herein are not limited to any particular kind of data.

The first range of proximities may be predetermined ranges of distance in one or more directions with respect to the switch indicator. In one embodiment, the proximities may be divided horizontally or vertically in GUI 104. For example, the position indicia 208 being located anywhere within the GUI 104 to the right of the switch indicator 206 may indicate that the plurality of pages should be scrolled through without a fine level of granularity.

In one embodiment, the switch indicator 206 may display the current page that is being viewed by the user. Alternatively, the switch indicator 206 does not display the current page that is being viewed by the user.

FIG. 2B illustrates the example from FIG. 2A with a fine level of navigation granularity. The position indicia 208 being located to the left of the switch indicator 206 may indicate that a fine level of navigation granularity should be utilized. The fine level of navigation granularity allows a user to scroll within a particular page to find sections, lines, words, etc. of interest as opposed to navigating without a fine level of granularity to quickly scroll through pages or large sections of data. The user may position the position indicia 208 within the second range of proximities 212 to indicate that the fine level of granularity should be utilized. For example, the user may position the position indicia 208 anywhere in the GUI 104 to the left of the switch indicator 206 to indicate that a fine level of granularity should be utilized.

In one embodiment, the first range of proximities is distinct from the second range of proximities. As a result, the user has a clear indication of where to place the position indicia 208 to scroll with a fine level of granularity or without a fine level of granularity.

In one embodiment, the fine level of granularity is restricted to the particular page, section, or portion of the data file being viewed. In the illustrated example in FIG. 2B, the user would be restricted to viewing the contents of the second page 208 and would not be allowed to move to another page unless the user moves the position indicia 208 to the right of the switch indicator 206. In an alternative embodiment, the user is not restricted to the particular page, section, or portion of the data file being viewed with a fine level of granularity. In the illustrated example in FIG. 2B, the user would be allowed to move from the second page 204 to the first page 202 with a fine level of granularity. The user would move more slowly from the second page 204 to the first page 202 with the fine level of granularity than without the fine level of granularity.

The user may utilize the switch indicator 206 to seamlessly move between different levels of granularity. For example, the user may move the position indicia 208 to the right of the switch indicator 206 to quickly get to a page of interest. The user may then move the position indicia 208 to the left of the switch indicator 206 to have a detailed look at the page of interest. The user may then position the position indicia 208 to the right of the switch indicator 206 to then find another page of interest. Accordingly, the user may navigate the GUI 104 in a fast and efficient manner.

Figure 2C:
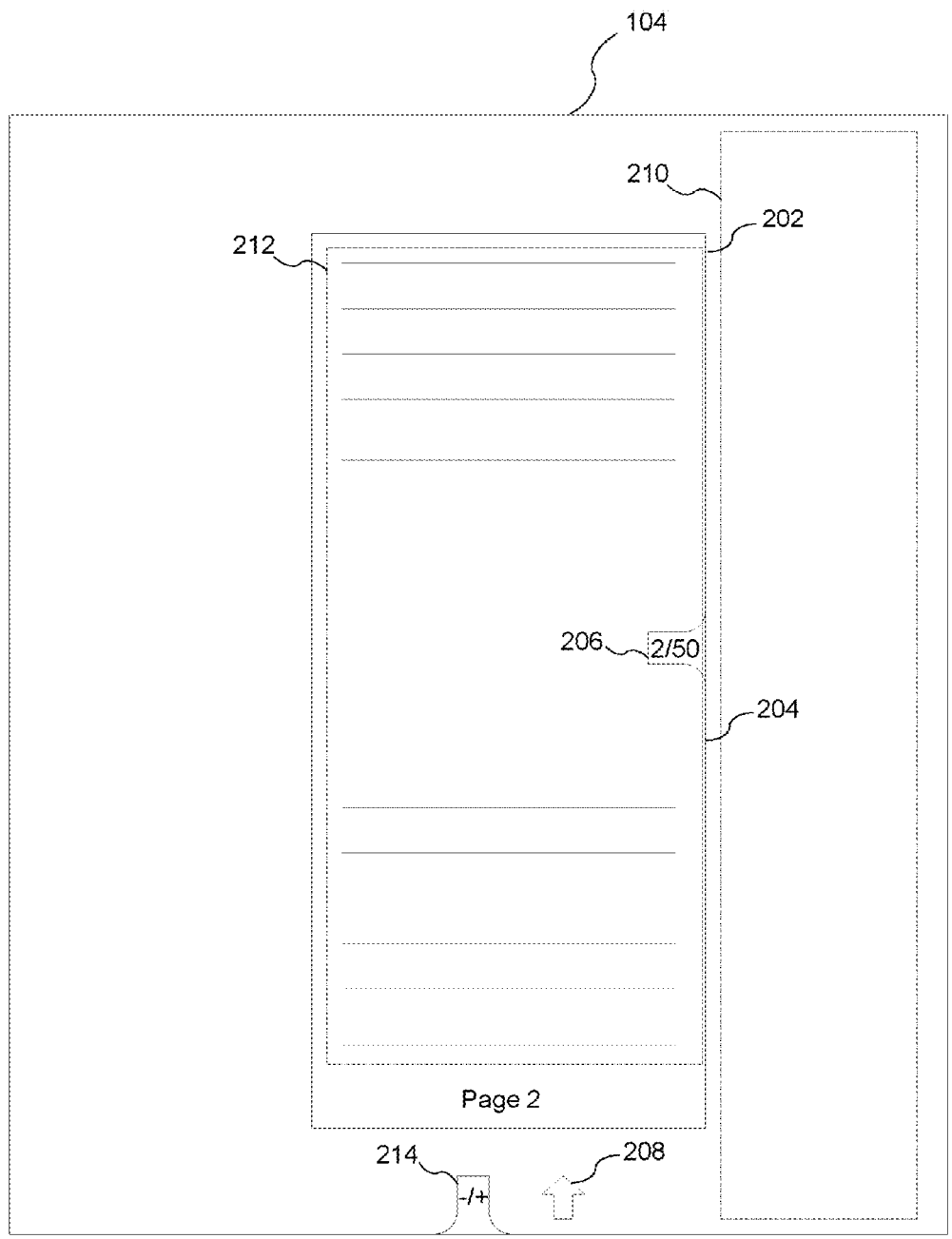
FIG. 2C illustrates an example of a zoom indicator that may be positioned at center of the bottom portion of the GUI.
Figure 2D:
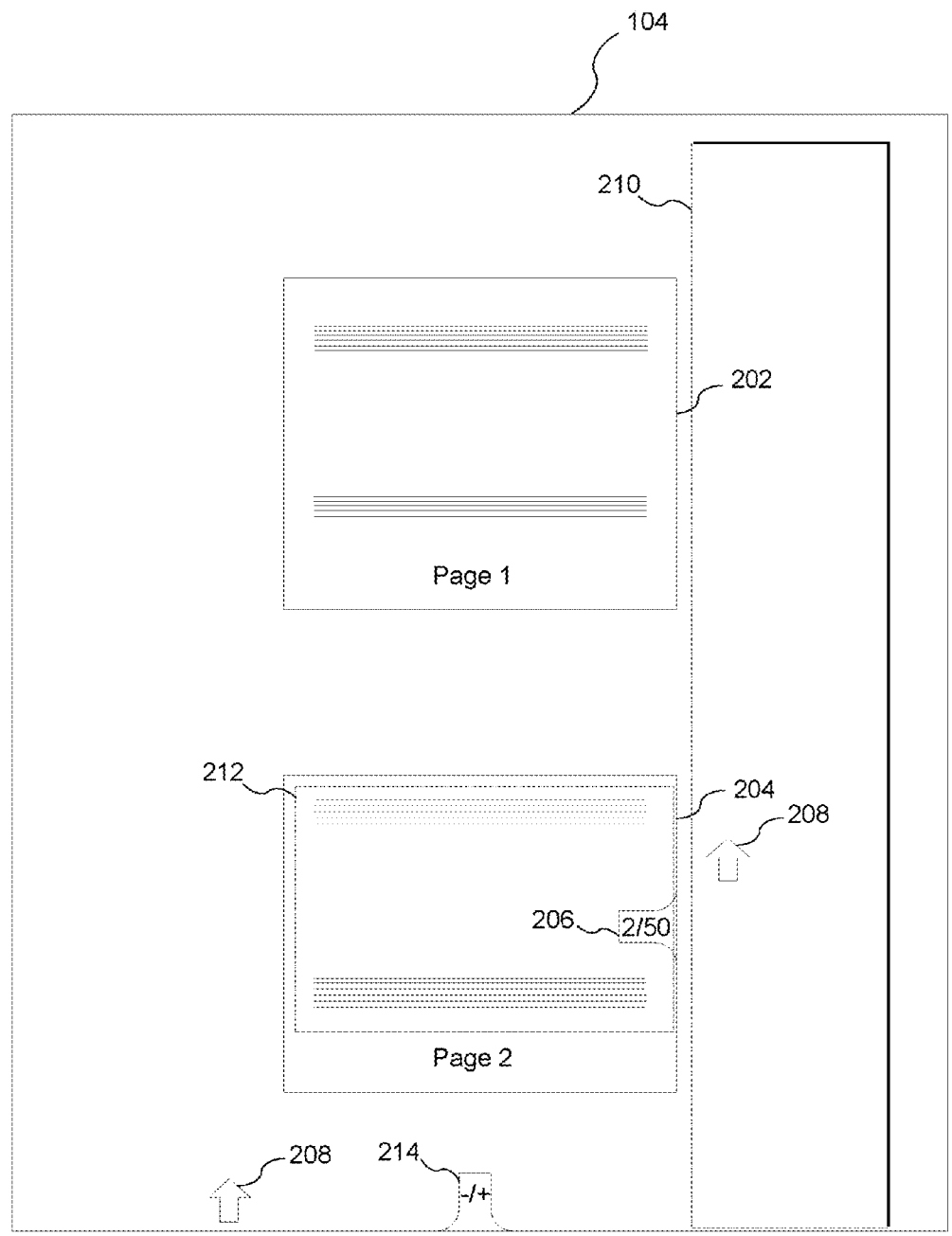
FIG. 2D illustrates another example of the zoom indicator.

In one embodiment, a zoom indicator may be utilized in addition to the switch indicator 206. FIG. 2C illustrates an example of a zoom indicator 214 that may be positioned at center of the bottom portion of the GUI 104. The user may move the position indicia 208 to the right of the zoom indicator 214 to increase the size of the one or more portions of the data file that are displayed. FIG. 2D illustrates another example of the zoom indicator 214. The user may move the position indicia 208 to the left of the zoom indicator 214 to decrease the size of the one or more portions of the data file that are displayed. Various other positions and directions may be utilized as this example is not intended to be limiting. In addition, the switch indicator 206 may move with the position of the position indicia 208.

Figure 3:
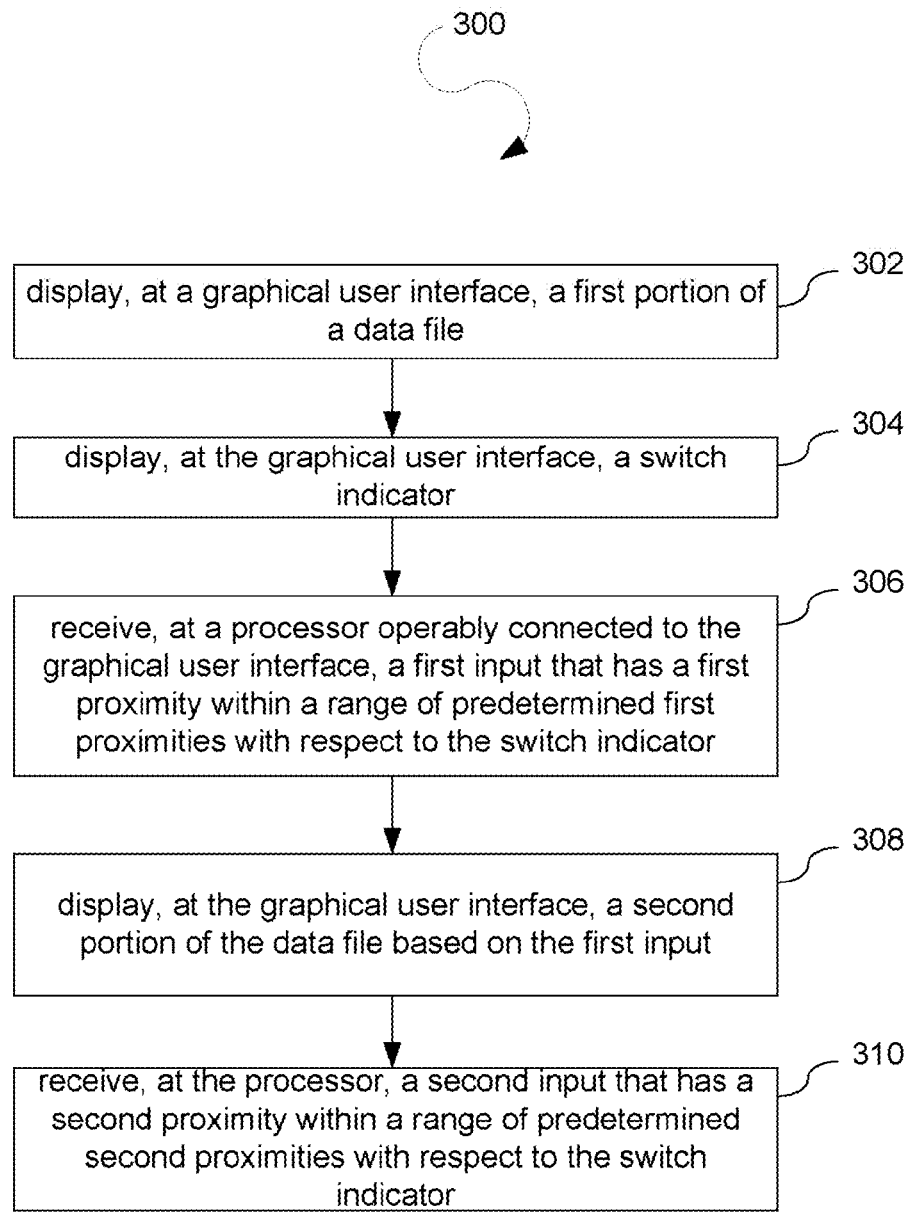
FIG. 3 illustrates a process that may be utilized to provide navigation of the GUI.

FIG. 3 illustrates a process 300 that may be utilized to provide navigation of the GUI 104. At a process block 302, the process 300 displays, at a graphical user interface, a first portion of a data file. Further, at a process block 304, the process 300 displays, at the graphical user interface, a switch indicator. In addition, at a process block 306, the process 300 receives, at a processor operably connected to the graphical user interface, a first input that has a first proximity within a range of predetermined first proximities with respect to the switch indicator. At a process block 308, the process 300 displays, at the graphical user interface, a second portion of the data file based on the first input. Further, at a process block 310, the process 300 receives, at the processor, a second input that has a second proximity within a range of predetermined second proximities with respect to the switch indicator, the range of predetermined second proximities being distinct from the range of first predetermined proximities. In addition, at a process block 312, the process 300 displays, at the graphical user interface, a subset of the second portion of the data file based on the second input.

Figure 4A:
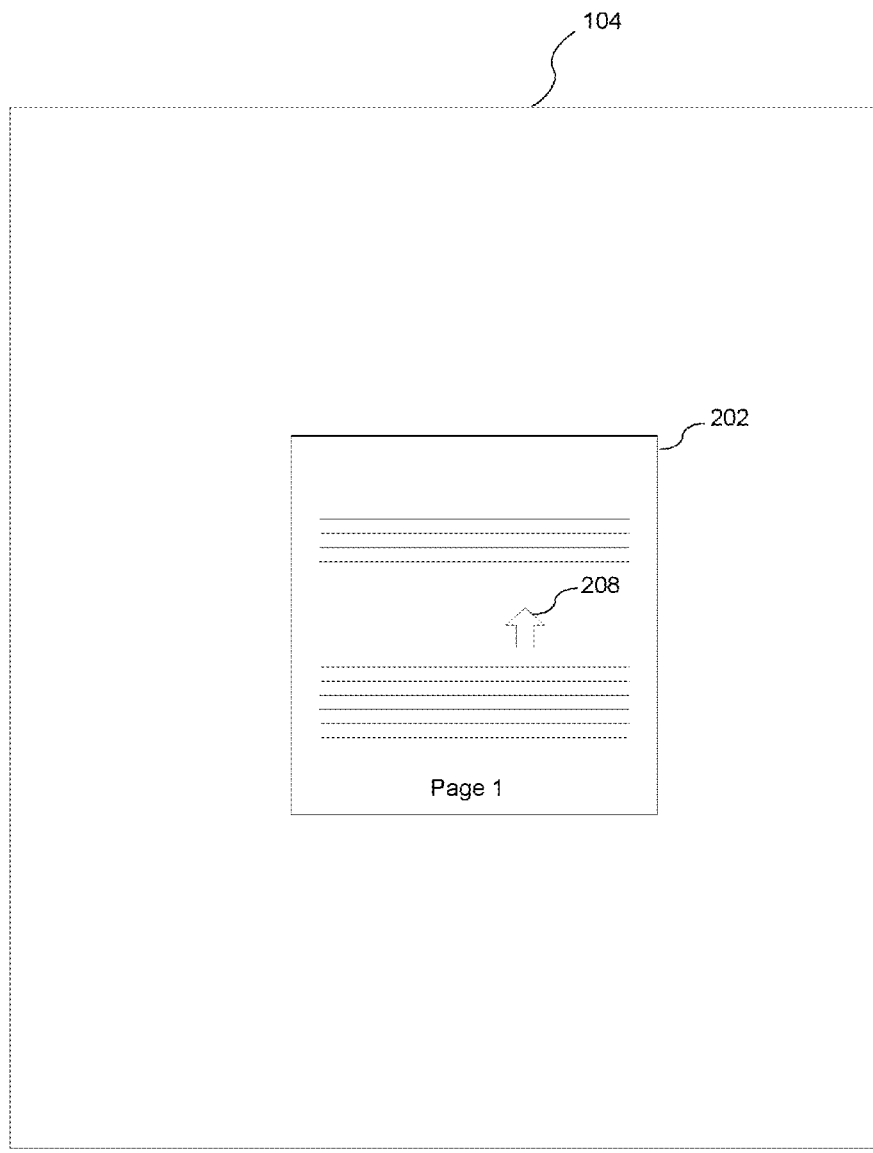
FIG. 4A illustrates another navigation approach that may be utilized with the GUI.

FIG. 4A illustrates another navigation approach that may be utilized with the GUI 104. As an example, the user may be viewing the first page 202. The user may select the first page 202 with the position indicia 208.

Figure 4B:
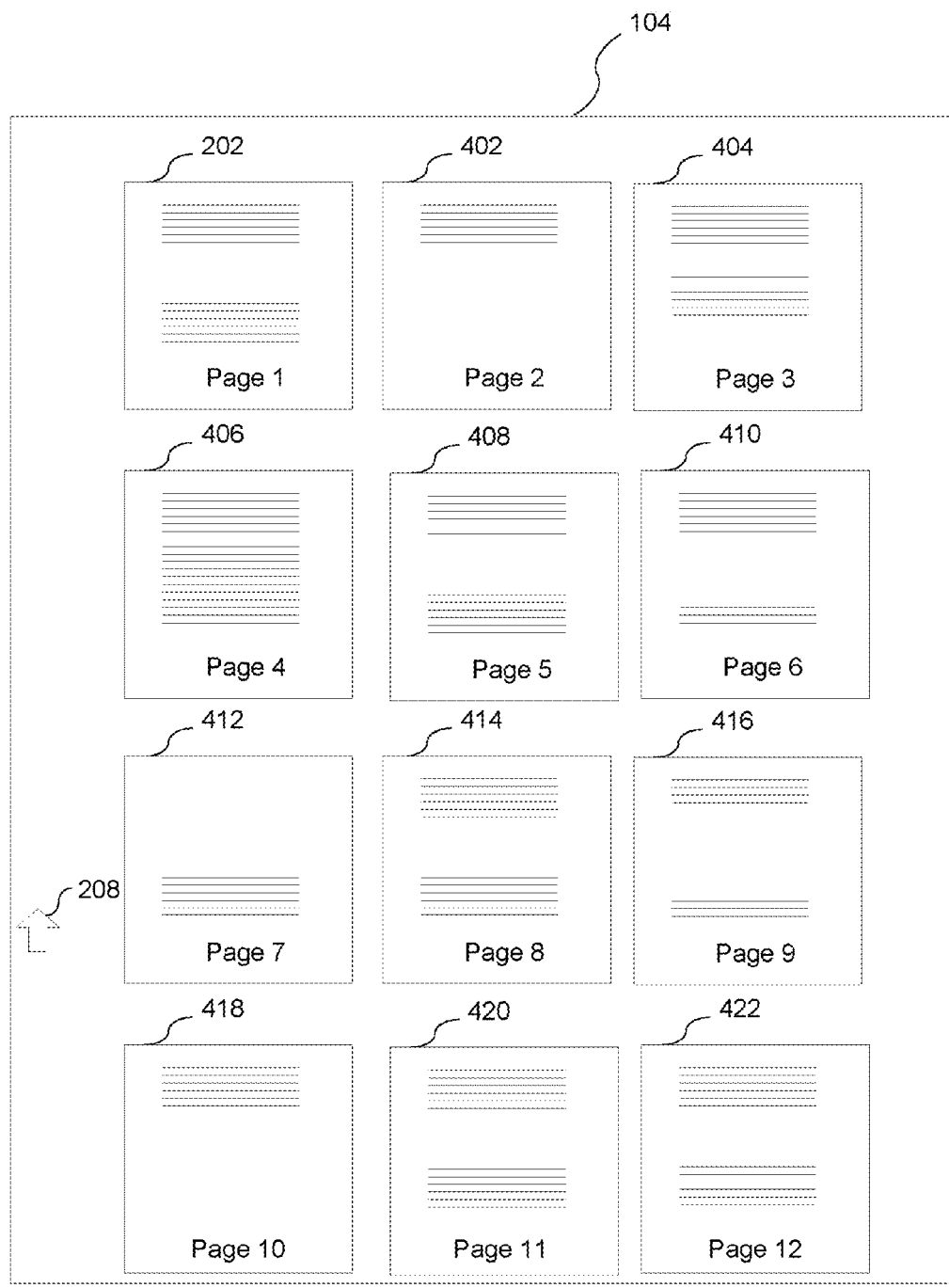
FIG. 4B illustrates an example of a grid view in the GUI that results from the user selection in FIG. 4A.

FIG. 4B illustrates an example of a grid view in the GUI 104 that results from the user selection in FIG. 4A. The grid view has a size range capability. For example, the illustration in FIG. 4B has three columns, but the number of columns may range from two columns to any number that retains legibility. The amount of granularity may also be based on the number of pages. A smaller amount of pages would result in a smaller amount of page thumbnail columns. The first page 202 is decreased in size so that a grid view of a plurality of pages may be displayed in an animated fashion with a motion transition. The grid view includes the first page 202, a second page 402, a third page 404, a fourth page 406, a fifth page 408, a sixth page 410, a seventh page 412, an eighth page 414, a ninth page 416, a tenth page 418, an eleventh page 420, and a twelfth page 422. The user may now position the position indicia 208 over a page to expand the view of a different page. In one embodiment, the user releases the position indicia 208 over the page of interest to make a selection. For example, the user may release a mouse button, remove a finger, etc.

Figure 4C:
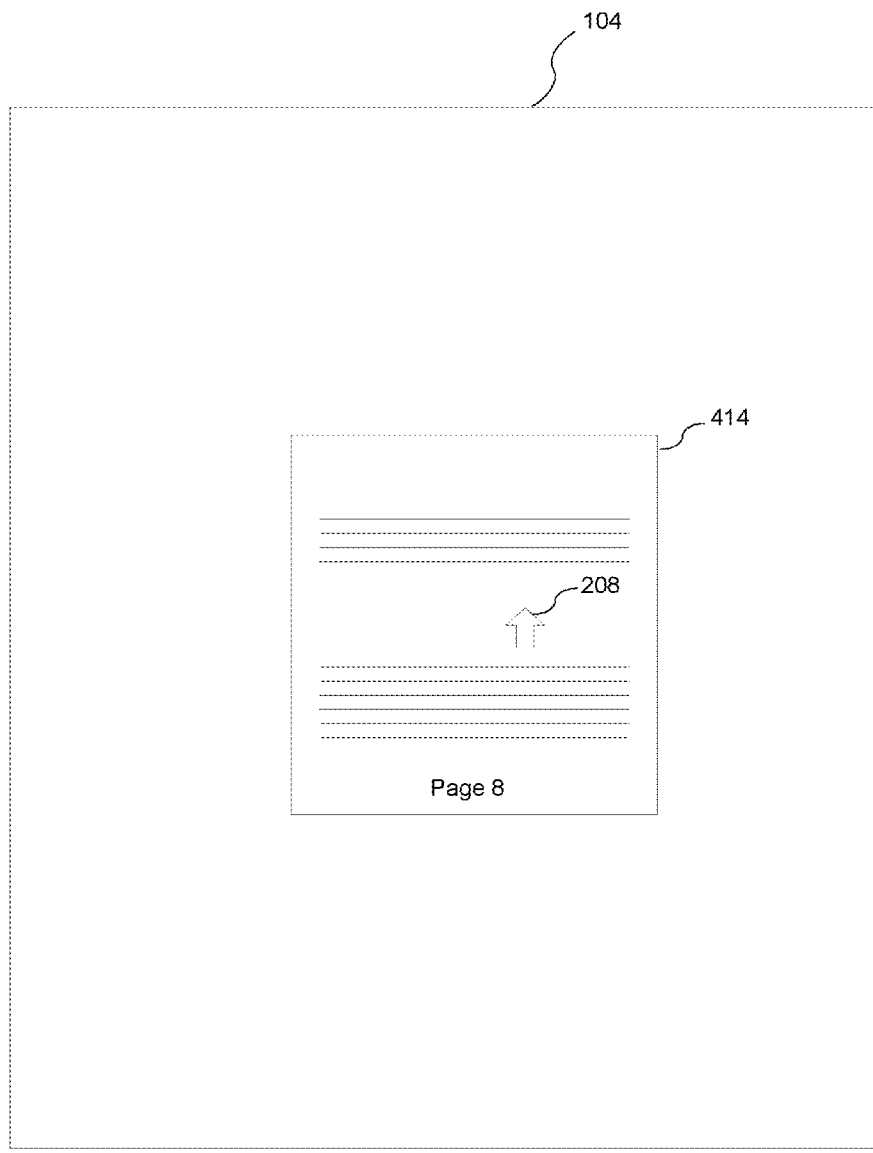
FIG. 4C illustrates the example of FIG. 4B where the user has selected a page.

FIG. 4C illustrates the example of FIG. 4B where the user has selected a page. As an example, the user has selected the eighth page 414. Accordingly, the eighth page 414 is displayed without the grid view optionally utilizing motion for the transition between FIG. 4B and FIG. 4C.

Figure 5:
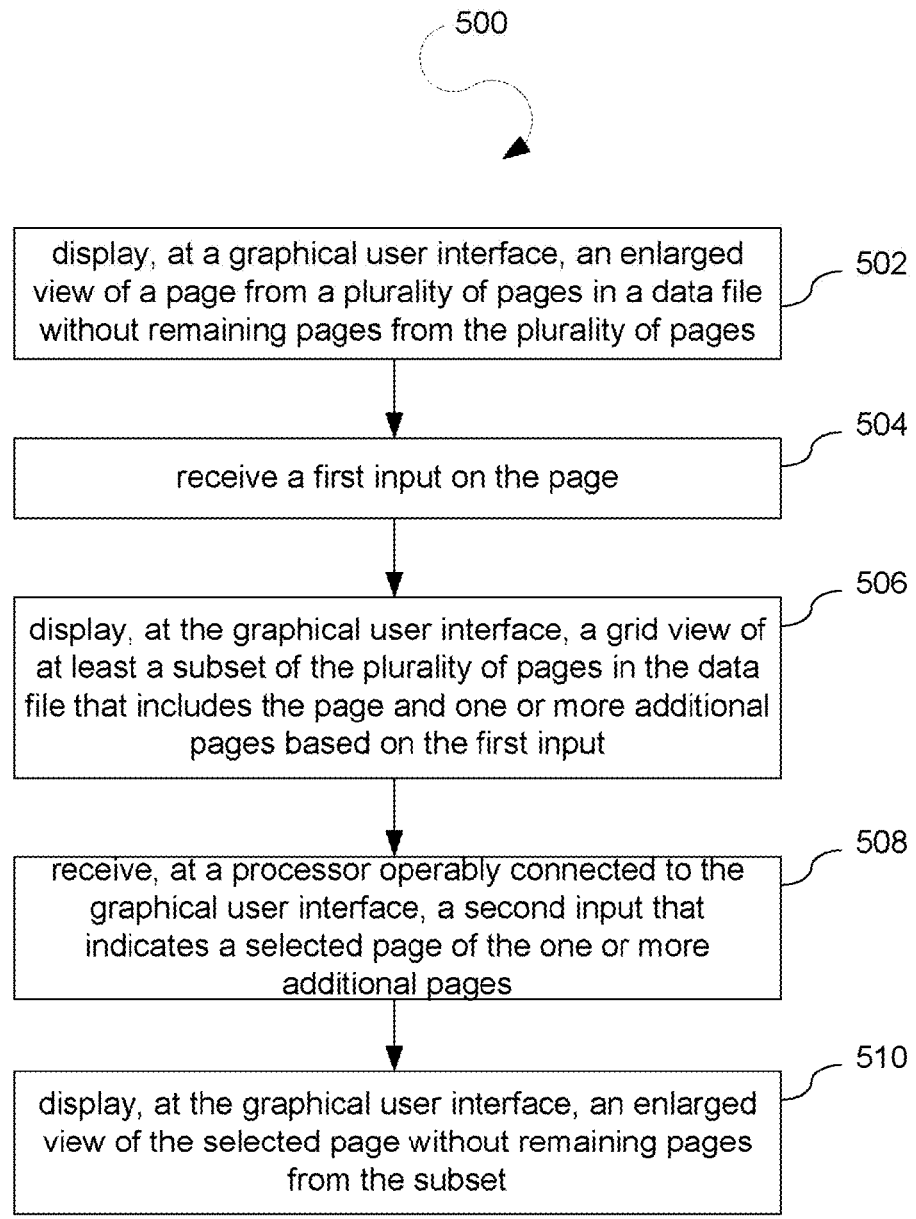
FIG. 5 illustrates a process that is utilized to perform the grid view and selection operations illustrated in FIGS. 4A-4C.

FIG. 5 illustrates a process 500 that is utilized to perform the grid view and selection operations illustrated in FIGS. 4A-4C. At a process block 502, the process 500 displays, at the GUI 104, an enlarged view of a page from a plurality of pages in a data file without remaining pages from the plurality of pages. Further, at a process block 504, the process 500 receives a first input on the page. In addition, at a process block 506, the process 500 displays, at the GUI 104, a grid view of at least a subset of the plurality of pages in the data file that includes the page and one or more additional pages based on the first input. At a process block 508, the process 500 receives, at a processor operably connected to the graphical user interface, a second input that indicates a selected page of the one or more additional pages. Further, at a process block 510, the process 500 displays, at the GUI 104, an enlarged view of the selected page without remaining pages from the subset.

Figure 6A:
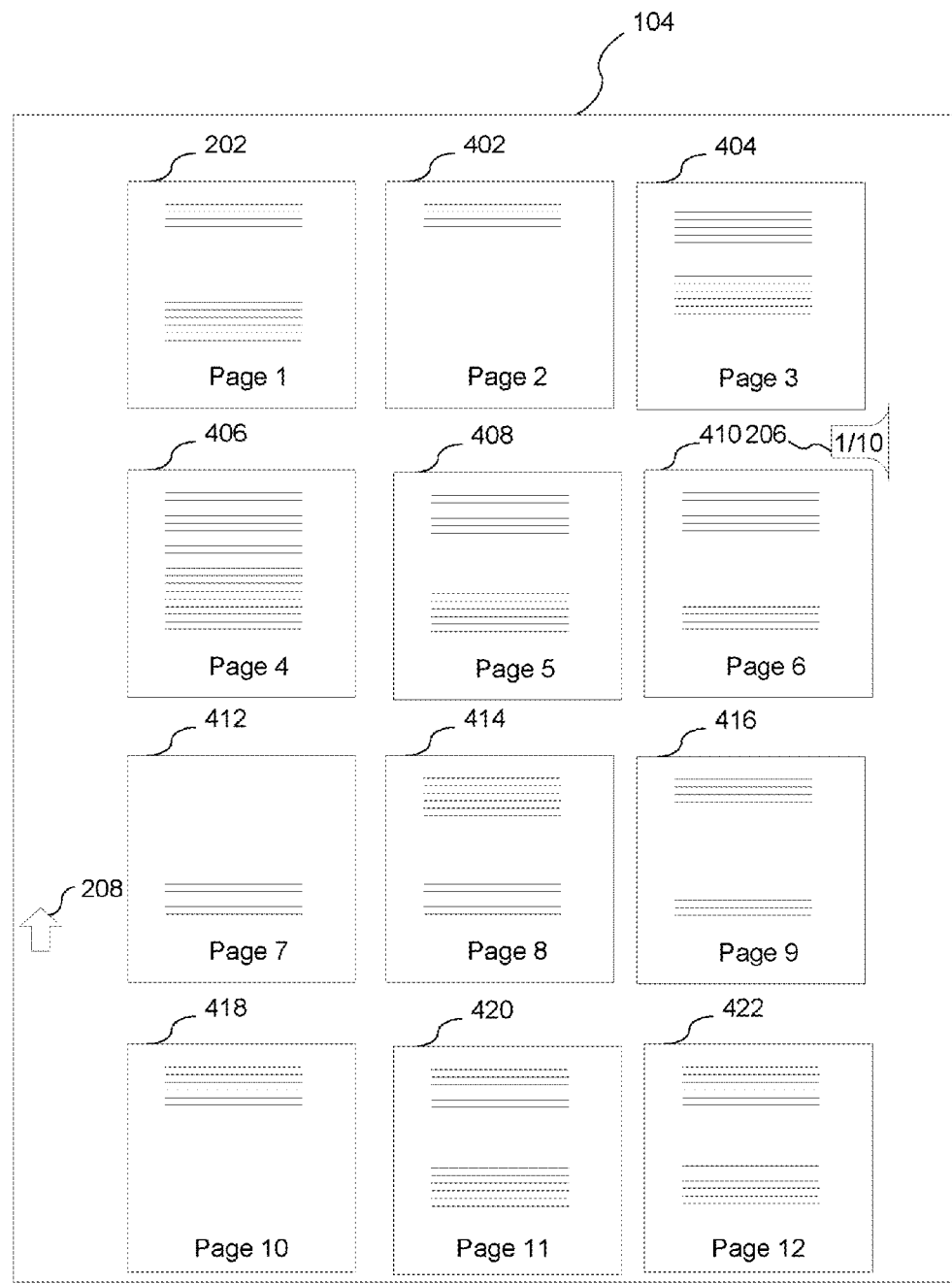
FIG. 6A illustrates the grid view of pages illustrated in FIG. 4B being navigated with a fine level of granularity.

In one embodiment, the switch indicator 206 illustrated in FIGS. 2A and 2B may be utilized with the grid view and selection operations illustrated in FIGS. 4A-4C. FIG. 6A illustrates the grid view of pages illustrated in FIG. 4B being navigated with a fine level of granularity. The switch indicator 206 allows the user to switch between a fine level of granularity to select specific pages within a grid view or a level without fine granularity to quickly move through different grid views. As an example, the switch indicator illustrated in FIG. 6A indicates that the user is viewing the first grid view out of ten grid views. As the position indicia 208 is to the left of the switch indicator 206, the user is viewing the different pages with a fine level of granularity. However, the user moves the position indicia 208 to the right of the switch indicator 206, the user views different grid views without a fine level of granularity.

Figure 6B:
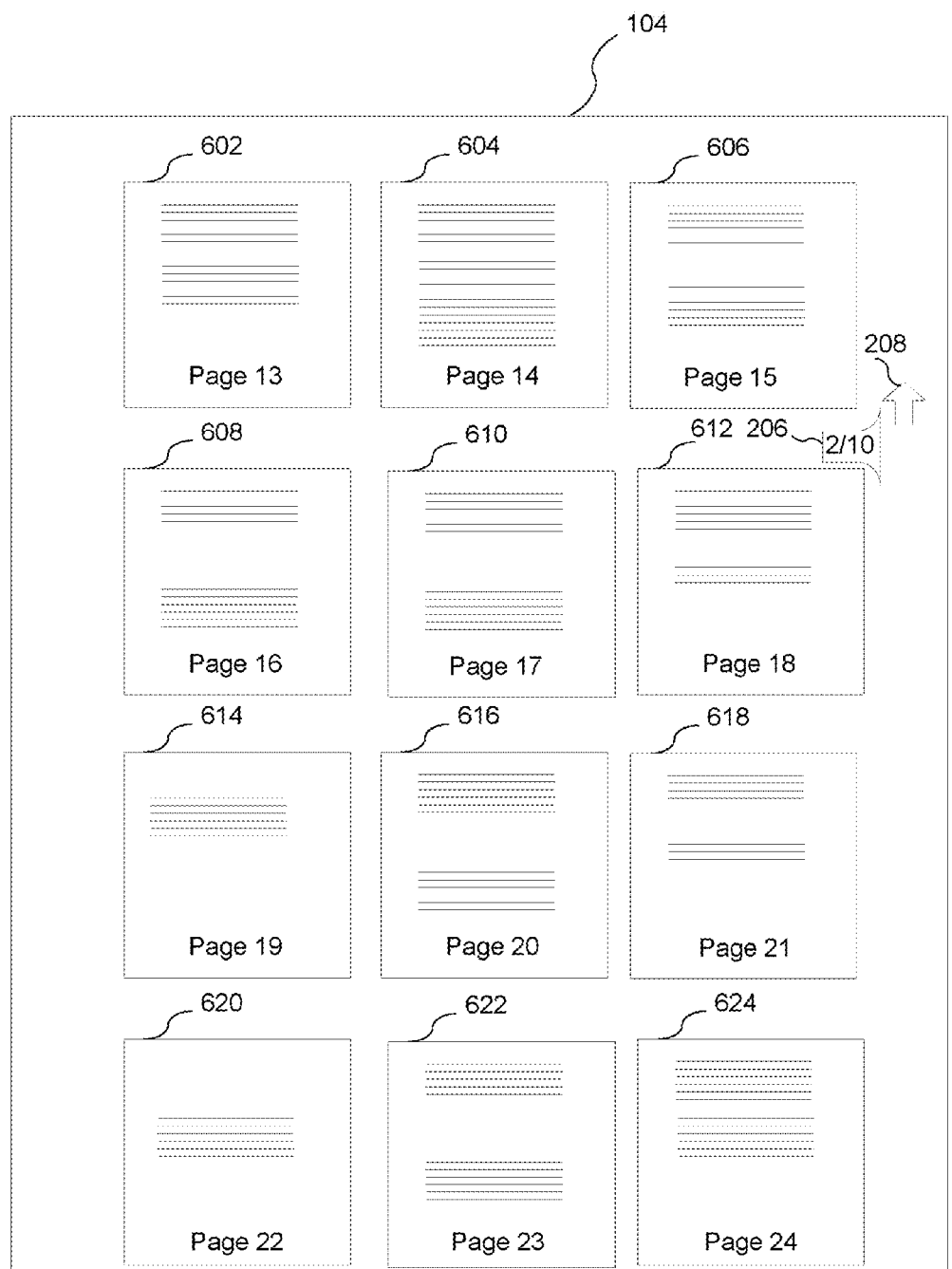
FIG. 6B illustrates an example in which the user views grid views without a fine level of granularity.

FIG. 6B illustrates an example in which the user views grid views without a fine level of granularity. The user has moved the position indicia 208 to the right of the switch indicator 206 in FIG. 6A. As a result, the user views a second grid view that includes a thirteenth page 602, a fourteenth page 604, a fifteenth page 606, a sixteenth page 608, a seventeenth page 610, an eighteenth page 612, a nineteenth page 614, a twentieth page 616, a twenty first page 618, a twenty second page 620, a twenty third page 622, and a twenty fourth page 624. The user can efficiently move between different grid views by positioning the position indicia 208 within a range of proximities with respect to the switch indicator 206 and can look specifically within the grid view by positioning the position indicia 208 within another range of proximities with respect to the switch indicator 206.

Figure 7:
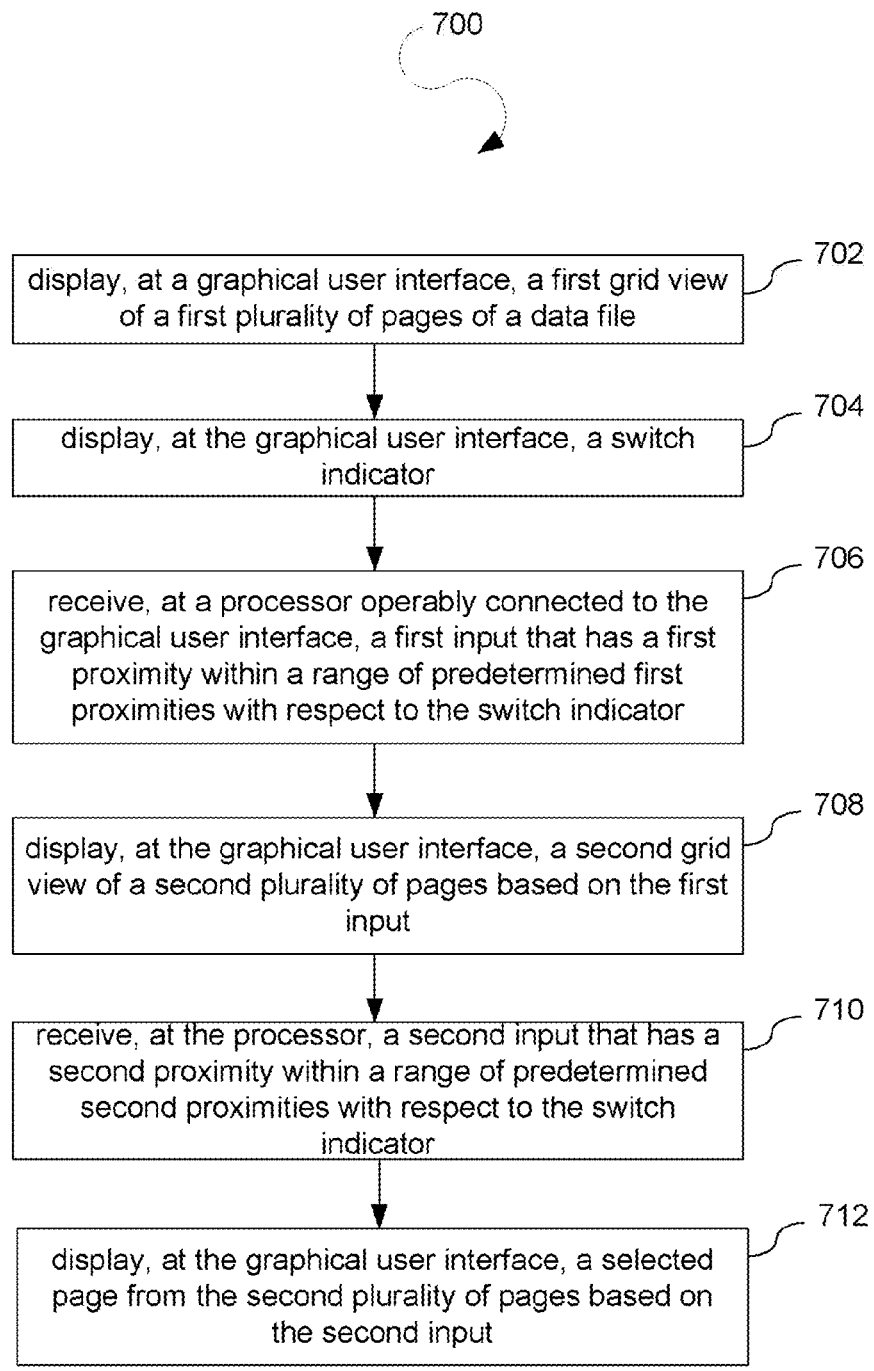
FIG. 7 illustrates a process that may be utilized to perform navigation with a grid view.

FIG. 7 illustrates a process 700 that may be utilized to perform navigation with a grid view. At a process block 702, the process 700 displays, at the GUI 104, a first grid view of a first plurality of pages of a data file. Further, at a process block 704, the process 700 displays, at the GUI 104, the switch indicator 206. In addition, at a process block 706, the process 700 receives, at a processor operably connected to the GUI 104, a first input that has a first proximity within a range of predetermined first proximities with respect to the switch indicator. Further, at a process block 708, the process 700 displays, at the GUI 104, a second grid view of a second plurality of pages based on the first input. Further, at a process block 710, the process receives, at the processor, a second input that has a second proximity within a range of predetermined second proximities with respect to the switch indicator. The range of predetermined second proximities is distinct from the range of first predetermined proximities. In addition, at a process block 712, the process 700 displays, at the GUI 104, a selected page from the second plurality of pages based on the second proximity.

In yet another embodiment, the user may provide a single tap to move to the previous page or to the next page. The single tap may be inputted in the top half of the GUI 104 or the bottom half of the GUI 104. For example, the user may input a single tap in the top half of the GUI 104 to move to the next page or a single tap in the bottom half of the GUI 104 to move to the previous page.

Figure 8:
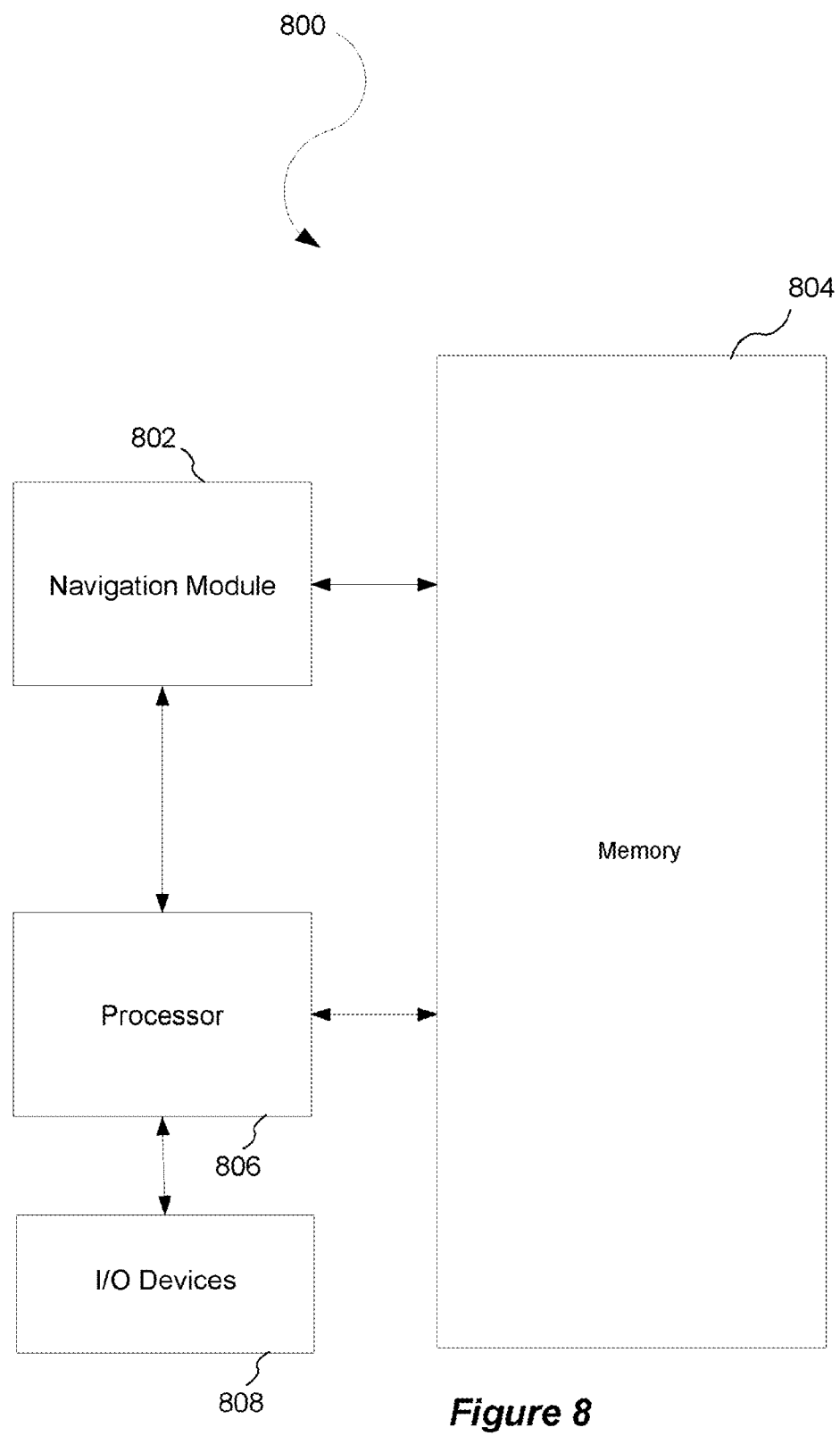
FIG. 8 illustrates a system configuration that may be utilized for navigation.

FIG. 8 illustrates a system configuration 800 that may be utilized for navigation. In one embodiment, a navigation module 802 interacts with a memory 804. In one embodiment, the system configuration 800 is suitable for storing and/or executing program code and is implemented using a general purpose computer or any other hardware equivalents. The processor 806 is coupled, either directly or indirectly, to the memory 804 through a system bus. The memory 804 can include local memory employed during actual execution of the program code, bulk storage, and/or cache memories which provide temporary storage of at least some program code in order to reduce the number of times code must be retrieved from bulk storage during execution.

The Input/Output ("I/O") devices 808 can be coupled directly to the system configuration 800 or through intervening input/output controllers. Further, the I/O devices 808 may include a keyboard, a keypad, a mouse, a microphone for capturing speech commands, a pointing device, and other input devices that will be recognized by one of ordinary skill in the art. Further, the I/O devices 808 may include output devices such as a printer, display screen, or the like. Further, the I/O devices 808 may include a receiver, transmitter, speaker, display, image capture sensor, biometric sensor, etc. In addition, the I/O devices 808 may include storage devices such as a tape drive, floppy drive, hard disk drive, compact disk ("CD") drive, etc.

Network adapters may also be coupled to the system configuration 800 to enable the system configuration 800 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

I claim:

1. A method comprising:
    displaying, at a graphical user interface, a first grid view of a first plurality of pages of a data file;
    displaying, at the graphical user interface, a switch indicator;
    receiving, at a processor operably connected to the graphical user interface, a first input that has a first proximity within a range of predetermined first proximities with respect to the switch indicator, the first input comprising a touch of a finger;
    displaying, at the graphical user interface, a second grid view of a second plurality of pages based on the first input;
    receiving, at the processor, a second input that has a second proximity within a range of predetermined second proximities with respect to the switch indicator, the range of predetermined second proximities being distinct from the range of first predetermined proximities, the second input comprising a release of the first input;
    removing the second grid view after the processor receives the second input; and
    displaying, at the graphical user interface, a selected page from the second plurality of pages based on the second input.

2. The method of claim 1, further comprising removing the first grid view after the processor receives the first input.

3. The method of claim 1, further comprising removing the second grid view after the processor receives the second input.

4. The method of claim 1, wherein the first plurality of pages is distinct from the second plurality of pages.

5. The method of claim 1, wherein the first input further comprises a scrolling motion.

6. The method of claim 5, wherein the second input further comprises termination of the scrolling motion.

7. A computing system comprising:
    one or more processors; and
    memory having instructions stored thereon that, responsive to execution by the one or more processors, causes the one or more processors to perform operations comprising:
        displaying, at a graphical user interface, a page from a plurality of pages in a data file without remaining pages from the plurality of pages in the data file;
        receiving a selection of the page;
        responsive to receiving the selection of the page, displaying, at the graphical user interface, a first grid view of at least a subset of the plurality of pages in the data file that includes the page and one or more additional pages;
        displaying, at the graphical user interface, a switch indicator;
        receiving a first input at the graphical user interface, the first input controlling a position of a position indicia displayed at the graphical user interface, the first input comprising:
            a click of a mouse button; and
            a scrolling motion;
        responsive to receiving the first input, navigating to a display of a second grid view of the plurality of pages, the navigation performed:
            concurrently with receiving the first input;
            at a coarse granularity responsive to the position indicia being within a range of predetermined first proximities with respect to the switch indicator during the scrolling motion; and
            at a fine granularity responsive to the position indicia being within a range of predetermined second proximities with respect to the switch indicator during the scrolling motion;

receiving a second input at the graphical user interface, the second input comprising a release of the first input when the position indicia is positioned over a selected page of the plurality of pages in the second grid view; and responsive to receiving the second input, displaying an enlarged view of the selected page.

8. The computing system of claim 7, further comprising displaying a zoom indicator.

9. The computing system of claim 8, further comprising enlarging a display of the second grid view responsive to the position indicia being within a range of predetermined first proximities with respect to the zoom indicator during the scrolling motion.

10. The computing system of claim 8, further comprising miniaturizing a display of the second grid view responsive to the position indicia being within a range of predetermined second proximities with respect to the zoom indicator during the scrolling motion.

11. A method comprising:
displaying, at a graphical user interface, a first grid view of a plurality of pages of a data file;
displaying, at the graphical user interface, a switch indicator;
receiving a first input at the graphical user interface, the first input comprising a scrolling motion and controlling a position of a position indicia displayed at the graphical user interface;
responsive to receiving the first input, navigating to a display of a second grid view of the plurality of pages of the data file, the navigation performed:
at a coarse granularity responsive to the position indicia being within a range of predetermined first proximities with respect to the switch indicator during the scrolling motion of the first input; and
at a fine granularity responsive to the position indicia being within a range of predetermined proximities with respect to the switch indicator during the scrolling motion of the first input;
receiving a second input at the graphical user interface, the second input comprising a release of the first input and indicating a selected page from the plurality of pages in the second grid view; and
responsive to receiving the second input, removing the second grid view of the plurality of pages and displaying an enlarged view of the selected page.

12. The method of claim 11, wherein the graphical user interface is operably connected to a touch enabled device.

13. The method of claim 11, wherein the first input comprises a click of a mouse button.

14. The method of claim 13, wherein the second input comprises a release of the mouse button.

15. The method of claim 11, wherein the first input comprises a touch of a finger.

16. The method of claim 15, wherein the second input comprises a release of the finger.

17. The method of claim 11, further comprising displaying a zoom indicator.

18. The method of claim 17, further comprising enlarging a display of the second grid view responsive to the position indicia being within a range of predetermined first proximities with respect to the zoom indicator during the scrolling motion.

19. The method of claim 17, further comprising miniaturizing a display of the second grid view responsive to the position indicia being within a range of predetermined second proximities with respect to the zoom indicator during the scrolling motion.

20. The method of claim 11, wherein the position indicia may seamlessly move between the range of predetermined first proximities and the range of predetermined second proximities with respect to the switch indicator.

* * * * *